Nov. 26, 1968   B. N. MARTENSSON ET AL   3,412,711
SOW'S FARROW BOX

Filed July 25, 1966   6 Sheets-Sheet 4

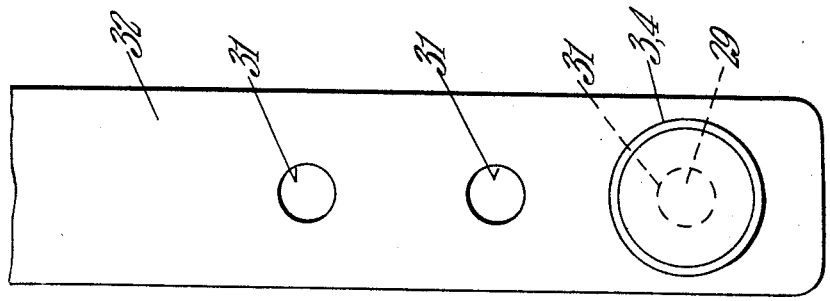
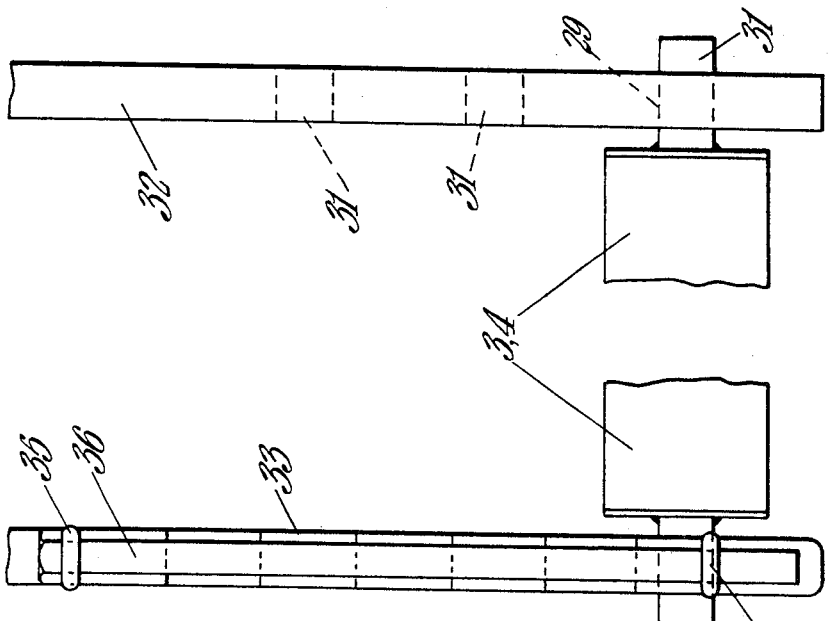
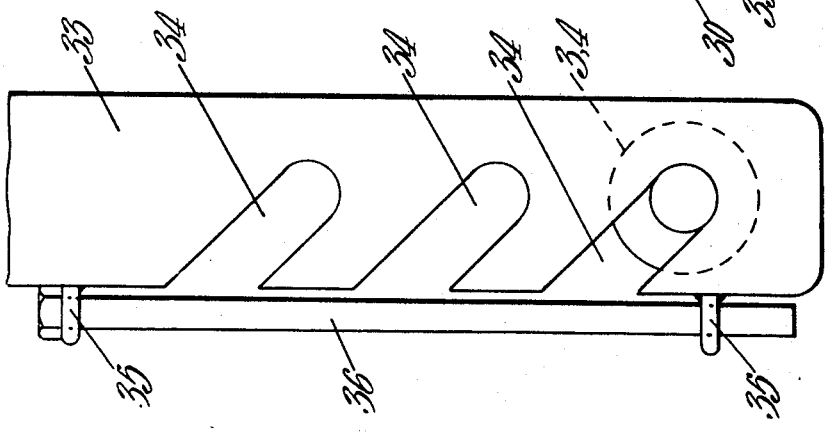

united States Patent Office 3,412,711
Patented Nov. 26, 1968

3,412,711
SOW'S FARROW BOX
Bror Nils Martensson, Daddhorva, Gunnebobruk, Sweden, and Torsten Gunnar Nelson, Helgerum, Skaftet, Sweden
Filed July 25, 1966, Ser. No. 567,651
4 Claims. (Cl. 119—20)

ABSTRACT OF THE DISCLOSURE

A sow's farrow box including a plurality of superimposed tubes arranged in substantial parallelism providing two sides with the tubes of one side being fixed to front and rear posts and the tubes of the other side being connected together at both ends by vertical cross pieces. The front piece is articulated on the front post and the rear piece removably fixed to the rear post with a detachable gate arranged between the front posts. The sides are connected by transverse tubes on the top tube and a rear transverse tube on the lowest tube with the transverse tube being adjustable according to the position of the side that can be opened.

---

The present invention concerns a sow's farrow box. Boxes for suckling sows are constructed of such size that the sows cannot kill the piglets by pressing them to death against the rear wall, or press them to death by lying on them. It is known to construct such boxes of steel tubes, the boxes having two substantially parallel side walls, each consisting of a plurality of substantially parallel tubes arranged over each other, which at the front end of the box are connected to transverse tubes which suitably carry a feed device, and wherein the sides are fixed to the front and back posts. This method has been found to present difficulties, since the sows cannot turn around in the boxes.

The present invention concerns a sow's farrow box which overcomes this disadvantage.

The box of the invention consists of two side walls, each comprising a plurality of substantially parallel tubes arranged over each other, with the tubes of one side being fixed in front and rear posts.

The feature of the invention is that the tubes of the other side wall are connected together at both ends by means of vertical cross pieces, the front cross piece being articulated in the front post and the rear cross piece being detachably fixed in the rear post; and that a detachable gate that can be opened is arranged between the two front posts, and the two side walls are connected together by means of at least two transverse tubes, arranged on the top tube, and a rear transverse tube arranged on the lowest tube, with said transverse tube being constructed as a telescopic tube, so that its length can be adjusted in accordance with the side that can be opened.

The invention will now be described with reference to the accompanying drawings, which show an embodiment of the invention but in no restrictive sense.

FIGURES 6, 7 and 8 show an arrangement of the vertical adjustment of the lowest tube.

Figure 1:
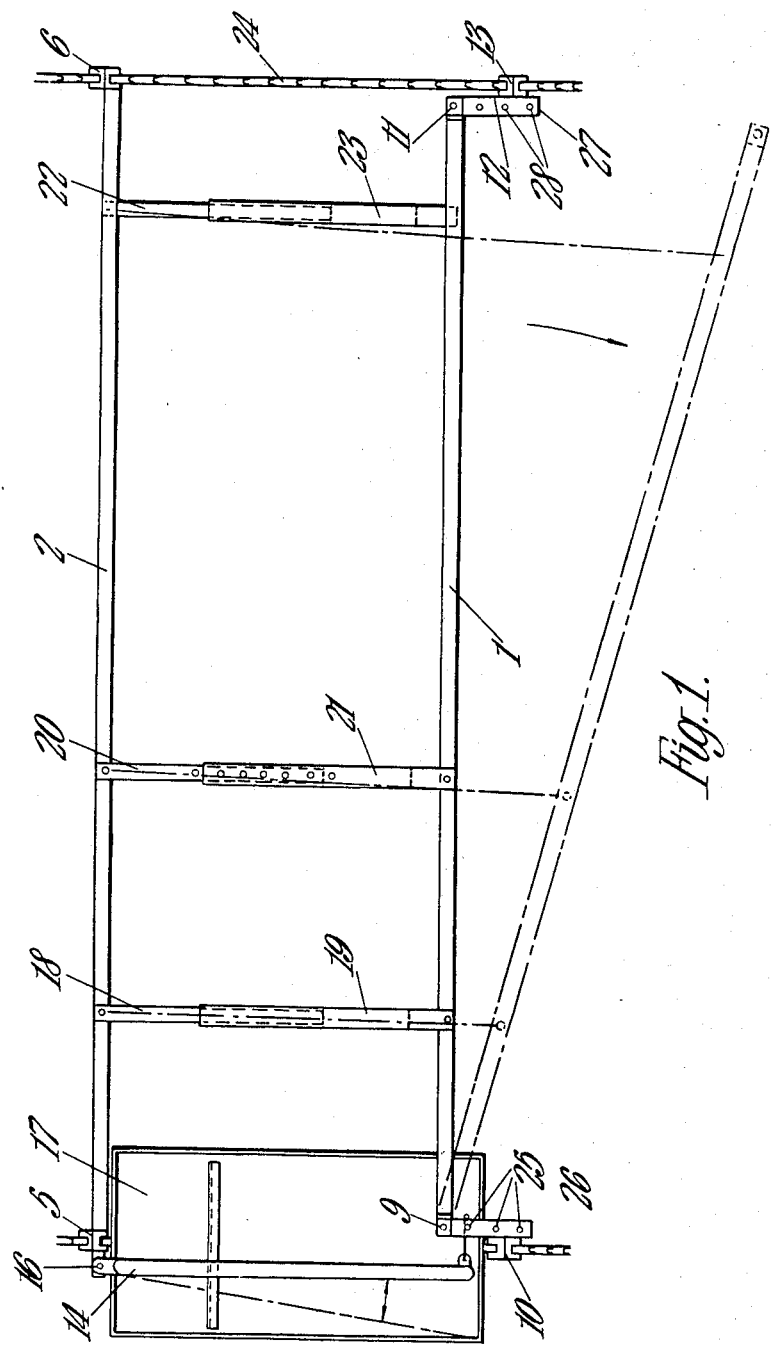
FIGURE 1 shows a plane view of the sow's farrow box of the invention.
Figure 2:
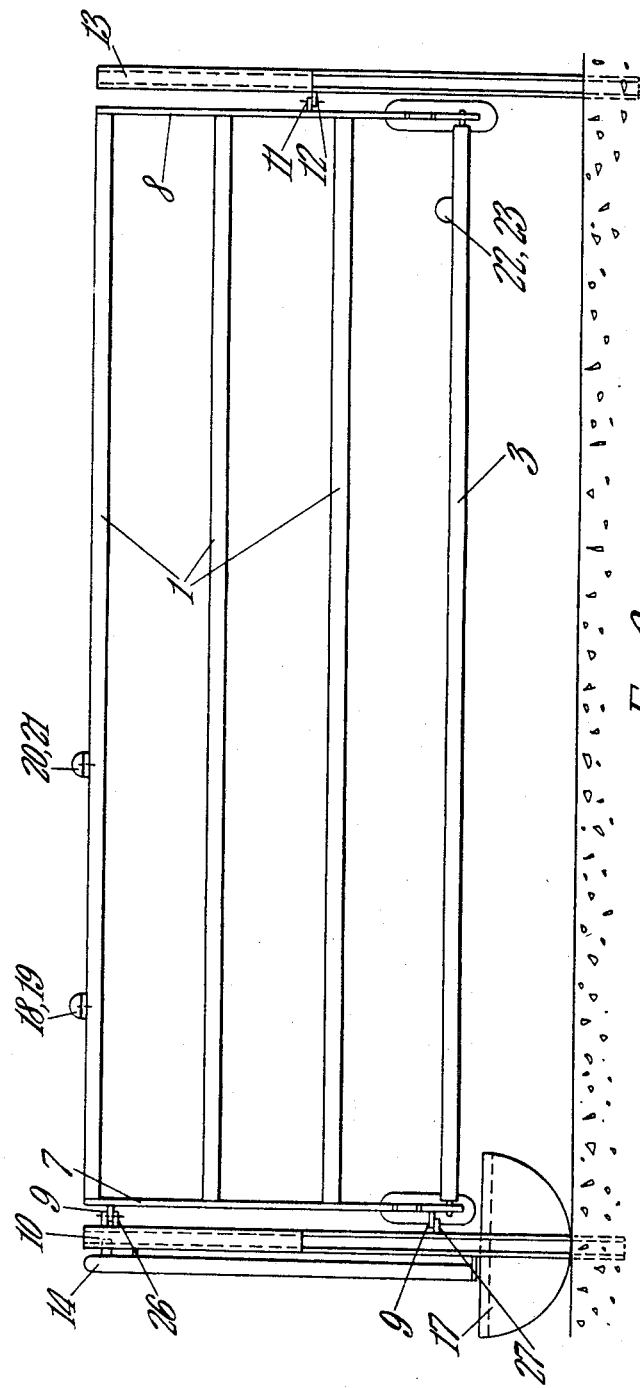
FIGURE 2 shows a lateral view of the same, with the gate.
Figure 3:
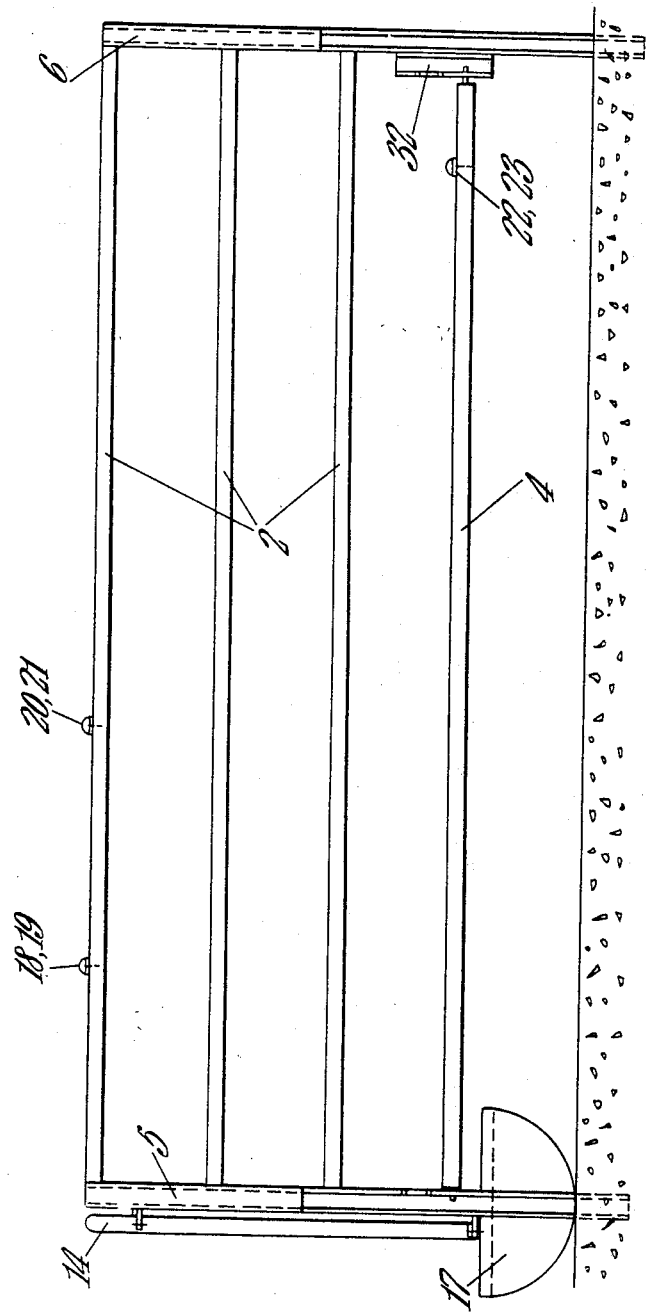
FIGURE 3 shows a lateral view of the same, with the fixed wall.
Figure 4:
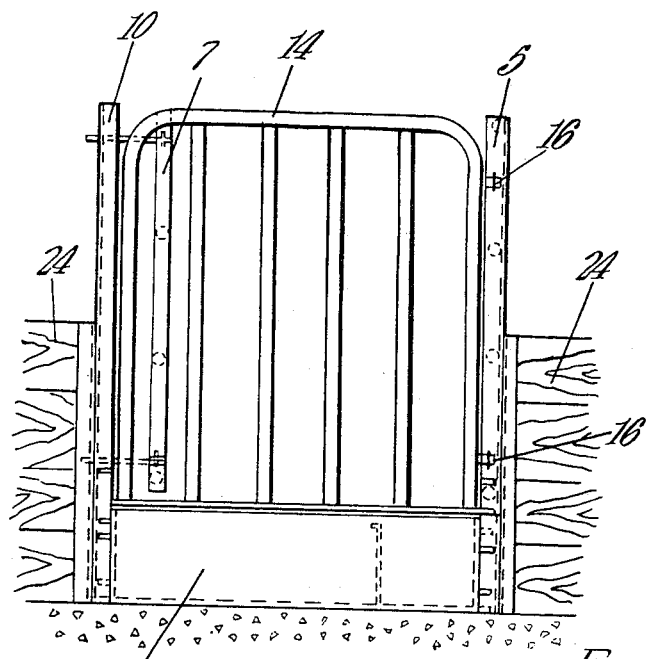
FIGURE 4 shows the front view of the box.
Figure 5:
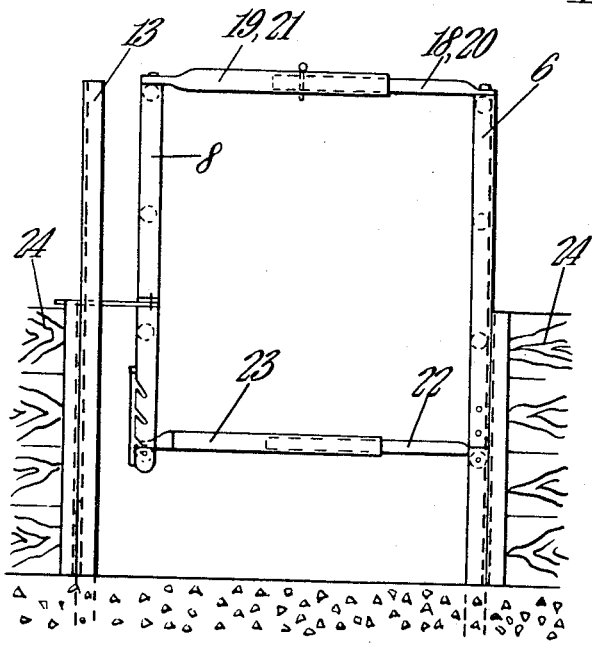
FIGURE 5 shows the rear view of the box.
Figure 9:
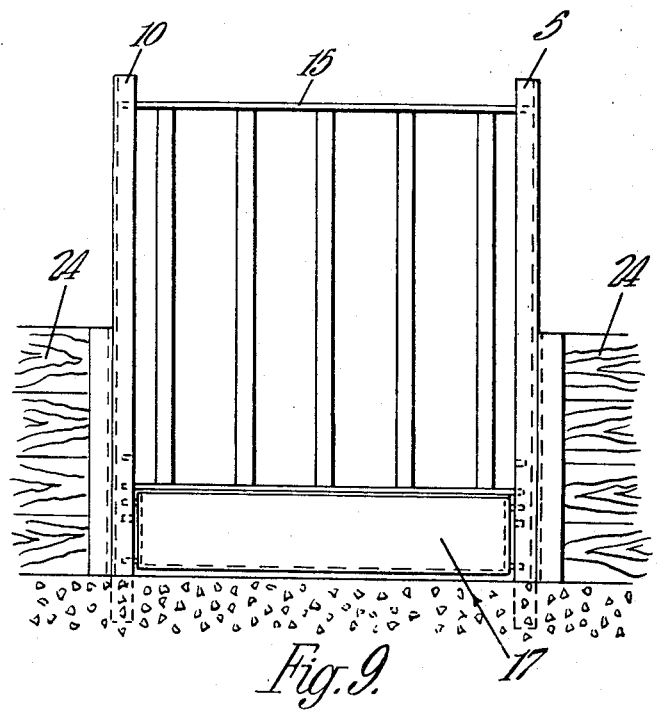
FIGURE 9 shows another embodiment of the gate.
Figure 10:
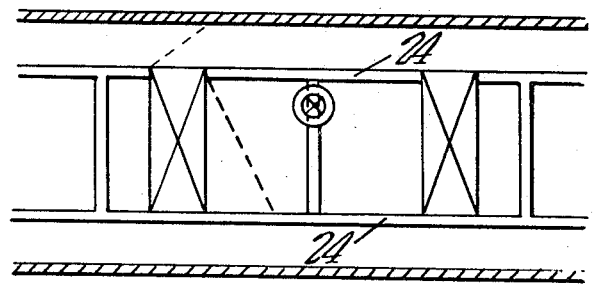
FIGURE 10 shows a simple arrangement with two boxes.

The two side walls each consist of four substantially parallel tubes 1, 2, 3, 4. The three top most tubes 2 in one side wall are connected in part with a front post 5, in part with a rear post 6, whereas tubes 1 in the other side wall are connected at their ends by means of vertical end-pieces 7, 8. The two lowest tubes 3, 4 in both side walls are arranged in such a way that they can be fixed in posts 5, 6 or respectively end-pieces 7, 8 so as to be vertically adjustable. The front, vertical end-piece 7 is articulated by means of eyes 9 with a front post 10, and the rear vertical end-piece 8 is provided with an eye 11, arranged in such a way that by a pin it can be fixed in an equivalent eye 12 in rear post 13. Between the two front posts 5, 10 a gate 14, 15, is arranged in such a way that either the gate 14 can swing forward, it being fixed with butt hinges in one post 5, or the gate 15 can be lifted out of slots in the two posts 5, 10. Between the two front posts 5, 10 a feed device 17 is arranged, which is not pertinent to the present invention and will not therefore be described in detail. The two top tubes 1, 2 in each side wall are connected together by means of two transverse tubes, 18, 19 respectively 20, 21, with these tubes 18, 19 and 20, 21 being arranged at a distance from the gate 14 such that it prevents a sow from getting out of her box. The two lowest tubes 3, 4 in the two side walls are rearwardly connected with transverse tubes 22, 23, to prevent the sow from pressing the piglets against a wall 24 closing the box, and so killing them. The transverse tubes are each constructed as telescopic tubes, 18, 19 and 20, 21 and 22, 23, which are pivotably fixed in the two side wall tubes 1, 2 and 3, 4. The front eye 9 of the pivotable side wall is arranged to be able by means of pins to be connected selectively with one of a series of holes 25 on the post 10, parallel with flat bars 26, 27 on the gates 14 and 15 respectively. The rear eye 11 of the side wall is arranged so that by means of a locking pin it can be locked in one of a series of holes 28 in the correspondingly formed eye 12 in the post 13.

It has been found advantageous to arrange the lowest tubes 3, 4 to be adjustable in height, by providing these tubes 3, 4 at both ends with pins 29, 30 one of which 29 is arranged to be put through a series of holes 31 in a flat bar 32 arranged on the rear post 6 or the vertical rear piece 8. The other pin 30 is arranged to be able to lie at an angle in a series of slots 34 arranged in a corresponding flat bar 33 which is arranged on the front post 5 or the vertical front piece 7, with the front ends of the slots being arranged to be closed by means of a bolt 36 put through two eyes 35 on the flat bar 33.

When a sow is to go into the box, the front gate 14 or 15 is opened, and the sow passes through the gateway head foremost. Then the pin is released which holds the rear end of the pivotable side, and the side is pivoted slowly to the side so that the sow can turn around in the box, whereupon the side is swung back and fixed with pins. The sow now remains in the box, where she has enough space to lie down, but not to throw herself sideways.

Piglets can easily get out under the lowest tubes 3, 4 on the side wall, which is adjusted with the increasing height of the piglet, and thus they are not exposed to the risk of being pressed to death by the sow as she lies down or turns around. If the sow should show a tendency to bite them to death, they can even escape from the box and only be carried there when necessary.

It has been found advantageous for the posts to be constructed with U-irons clamped together by their webs, so that between two adjacent front posts or two adjacent rear posts boards can be arranged, and so that quickly a dividing wall 24 can be set up or removed.

Of course, only one embodiment of the invention has been illustrated and described, and numerous variations are possible within the framework of the invention.

We claim:

1. A sow's farrow box, consisting of two sides, each comprising a plurality of substantially parallel tubes arranged over each other, the tubes of one side being fixed to front and rear posts, the tubes of the other side wall being connected together at both ends by means of vertical cross pieces, the front cross piece being articulated on the front post and the rear piece being detachably fixed on the rear post, a detachable gate that can be opened arranged between the two front posts, the two sides being connected together by means of at least two transverse tubes arranged on the top tube; and a rear transverse tube arranged on the lowest tube, said transverse tube being constructed as a telescopic tube in such a way that its length can be adjusted in accordance with the position of the side that can be opened.

2. A sow's farrow box as in claim 1, in which the lowest tubes are provided with pins, one of which is arranged to be inserted through a series of holes in a flat bar arranged on the rear post and the vertical rear piece, the other pin being arranged so that it can be placed at downward angle on an equivalent flat bar which is disposed in a series of slots arranged in the front post and the perpendicular front piece, the front ends of said slots being arranged to be closed by a bolt passing through two eyes in the flat bar in such a way that said tubes are vertically adjustable.

3. A sow's farrow box as claimed in claim 1 in which the posts are constructed with U-irons clamped together by their webs, so that between two adjacent front posts or respectively two adjacent rear posts boards can be arranged, and so that quickly a dividing wall can be set up or removed.

4. A sow's farrow box as claimed in claim 3 in which the gate is provided with laterally projecting studs, arranged to pass between the U-iron flanges of the posts.

References Cited

UNITED STATES PATENTS

| | | | |
|---|---|---|---|
| 1,656,127 | 1/1928 | Sargent | 256—25 |
| 2,714,367 | 8/1955 | Arnold | 119—27 |
| 2,764,127 | 9/1956 | Newman | 119—20 |
| 2,881,734 | 4/1959 | Hines | 119—20 |
| 3,002,493 | 10/1961 | Galamba | 119—20 |
| 3,209,728 | 10/1965 | Beckers | 119—20 |
| 3,307,519 | 3/1967 | Rink et al. | 119—20 |
| 3,318,286 | 5/1967 | Hargett | 119—20 |

FOREIGN PATENTS 1,180,993  11/1964  Germany.

ALDRICH F. MEDBERY, *Primary Examiner.*